(12) United States Patent
Wurmfeld

(10) Patent No.: US 10,783,851 B2
(45) Date of Patent: Sep. 22, 2020

(54) SYSTEMS AND METHODS FOR ADJUSTABLE POLARIZATION IN SERVICE PROVIDING TERMINALS

(71) Applicant: Capital One Services, LLC, McLean, VA (US)

(72) Inventor: David Wurmfeld, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/405,700

(22) Filed: May 7, 2019

(65) Prior Publication Data

US 2019/0266979 A1 Aug. 29, 2019

Related U.S. Application Data

(63) Continuation of application No. 15/907,556, filed on Feb. 28, 2018, now Pat. No. 10,332,486, which is a continuation of application No. 15/644,263, filed on Jul. 7, 2017, now Pat. No. 10,319,343.

(60) Provisional application No. 62/359,368, filed on Jul. 7, 2016.

(51) Int. Cl.

| | |
|---|---|
| *G09G 3/36* | (2006.01) |
| *G09G 5/10* | (2006.01) |
| *G02F 1/01* | (2006.01) |
| *G02F 1/1347* | (2006.01) |
| *G09G 5/14* | (2006.01) |
| *G06F 3/0488* | (2013.01) |

(52) U.S. Cl.
CPC ............ *G09G 5/10* (2013.01); *G02F 1/0136* (2013.01); *G02F 1/13471* (2013.01); *G09G 3/36* (2013.01); *G09G 5/14* (2013.01); *G06F 3/0488* (2013.01); *G09G 2320/0626* (2013.01); *G09G 2354/00* (2013.01)

(58) Field of Classification Search
CPC ............ G09G 5/10; G09G 2320/0626; H04N 9/3167; H04N 2201/02493; G02B 27/28; G02B 27/286
See application file for complete search history.

(56) References Cited

U.S. PATENT DOCUMENTS

| | | | |
|---|---|---|---|
| 10,332,486 B2 * | 6/2019 | Wurmfeld | ........... G02F 1/13471 |
| 2006/0187380 A1 | 8/2006 | Tsuda et al. | |
| 2015/0220760 A1 | 8/2015 | Foote et al. | |
| 2017/0336864 A1 | 11/2017 | Broz et al. | |

* cited by examiner

*Primary Examiner* — Antonio A Caschera
(74) *Attorney, Agent, or Firm* — Finnegan, Henderson, Farabow, Garrett & Dunner, LLP

(57) ABSTRACT

The embodiments include systems and methods for adjustable polarization in service-providing terminals. In some embodiments, a system may include a display, an input device, an adjustable polarization screen adjacent to the display, and a polarization adjuster. The system may further include a processor configured to execute instructions to perform operations comprising providing illumination to the adjustable polarization screen through the display, controlling, via the polarization adjuster, a polarization of the adjustable polarization screen to a first polarization, receiving, via the input device, a polarization selection input, and based on the polarization selection input, adjusting, via the polarization adjuster, the polarization of the adjustable polarization screen from the first polarization to a second polarization.

20 Claims, 10 Drawing Sheets

SYSTEMS AND METHODS FOR ADJUSTABLE POLARIZATION IN SERVICE PROVIDING TERMINALS

This application is a continuation of U.S. patent application Ser. No. 15/907,556, filed Feb. 28, 2018, currently pending, which claims priority to U.S. patent application Ser. No. 15/644,263, filed Jul. 7, 2017, which claims priority to U.S. Provisional Application Ser. No. 62/359,368, filed Jul. 7, 2016. The contents of the above-referenced applications are hereby incorporated in their entireties.

BACKGROUND

Many service-providing terminals, such as automated teller machines (ATMs), kiosks, user devices, and other terminals, include a cathode ray tube (CRT) or liquid crystal display (LCD) display through which a user may interact with the service-providing terminal. Information is typically displayed on CRT and LCD displays by illuminating the display with non-polarized light, which is selectively polarized by the display to create images and/or text representing the information.

A user of a service-providing terminal may, in some cases, wear polarized eyewear, such as sunglasses. The polarization of the user's sunglasses and the selectively polarized display of the service-providing terminal may destructively interfere, making it difficult for the user to view the information displayed on the display.

SUMMARY

The disclosed embodiments may include systems and methods for adjustable polarization in service-providing terminals.

In one embodiment, a system is disclosed that includes a display, an input device, an adjustable polarization screen, and a polarization adjuster, where the adjustable polarization screen is adjacent to the display. The system further includes a memory storing instructions and a processor configured to execute the instructions to perform operations. The operations include providing illumination to the adjustable polarization screen through the display and controlling, via the polarization adjuster, a polarization of the adjustable polarization screen to a first polarization. The operations further include receiving, via the input device, a polarization selection input and, based on the polarization selection input, adjusting, via the polarization adjuster, the polarization of the adjustable polarization screen from the first polarization to a second polarization.

In another embodiment, a method is disclosed that includes providing a display and an adjustable polarization screen adjacent to the display; providing illumination to the adjustable polarization screen through the display; controlling a polarization of the adjustable polarization screen to a first polarization; receiving a polarization selection input; and, based on the polarization selection input, adjusting the polarization of the adjustable polarization screen from the first polarization to a second polarization.

In yet another embodiment, a non-transitory computer-readable medium is disclosed storing instructions that, when executed by a processor, cause the processor to perform operations. The operations include providing a display and an adjustable polarization screen adjacent to the display; providing illumination to the adjustable polarization screen through the display; controlling a polarization of the adjustable polarization screen to a first polarization; receiving a polarization selection input; and, based on the polarization selection input, adjusting the polarization of the adjustable polarization screen from the first polarization to a second polarization.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings.

Figure 1:
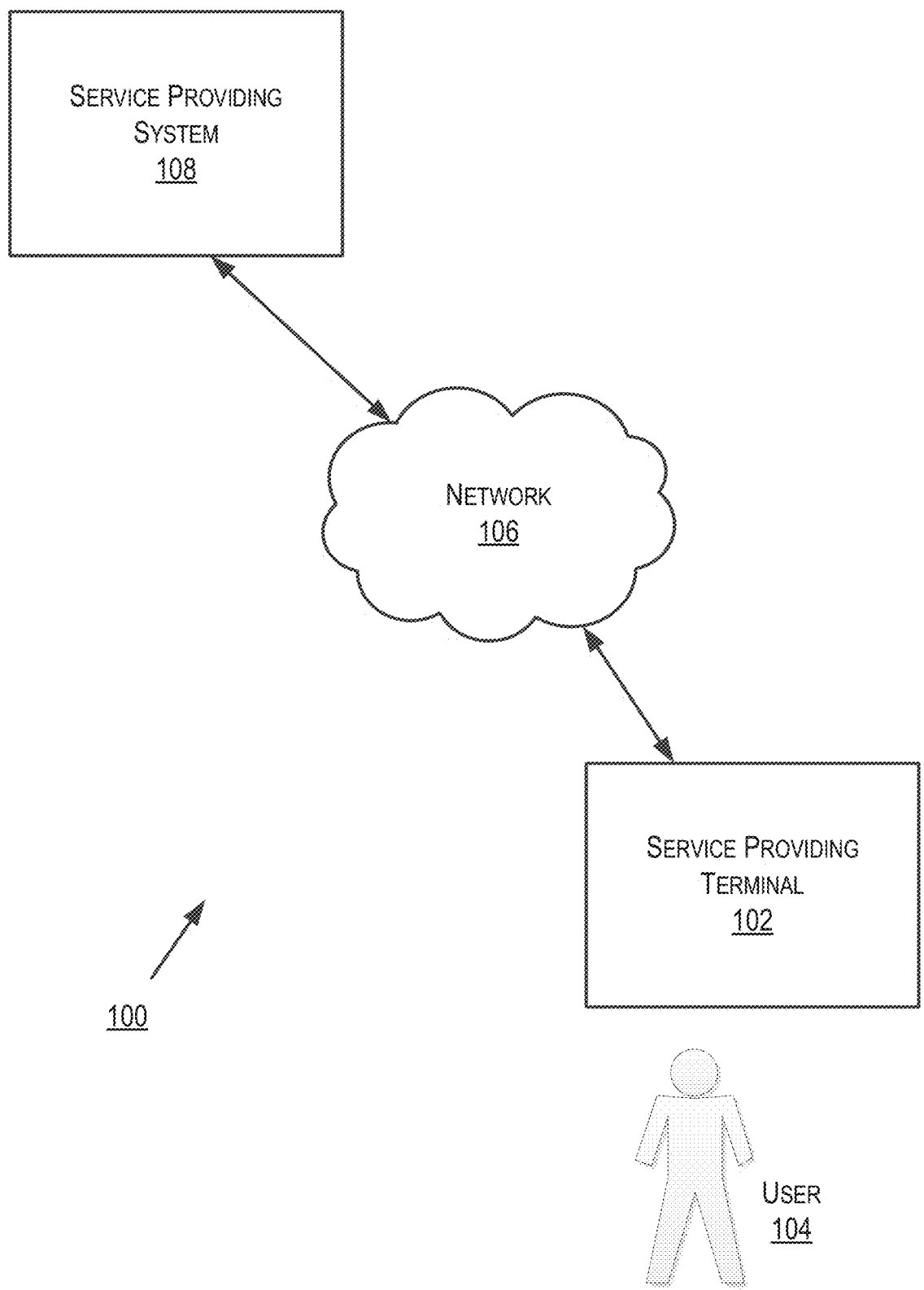
FIG. 1 is a block diagram of an example system, in accordance with disclosed embodiments.

FIG. 1 is a block diagram of an example system 100, in accordance with disclosed embodiments. System 100 may include a service-providing terminal 102. While one service-providing terminal 102 is shown, it will be understood that system 100 may include any number of service-providing terminals.

Service-providing terminal 102 may be any device configured for use by a user 104. In some embodiments, service-providing terminal 102 may take the form of, for example, a device configured to provide a service to user 104, such as an automated teller machine (ATM), a payment or purchase kiosk, an information kiosk, a point-of-sale device, or other device. Alternatively or additionally, in some embodiments service-providing terminal 102 may take the form of a user device, such as a mobile communication device, a cellular telephone, a smartphone, a tablet computer, a laptop computer, a desktop computer, or a wearable computing device, such as a watch or glasses. Service-providing terminal 102 may take other forms as well. Service-providing terminal 102 is described in further detail below in connection with FIG. 2.

In some embodiments, service-providing terminal 102 may be configured to communicate over a network 106. Network 106 may be any type of network configured to provide communications between service-providing terminal 102 and one or more other entities. For example, network 106 may be any type of network (including infrastructure) that provides communications, exchanges information, and/or facilitates the exchange of information, such as the Internet, a Local Area Network, near field communication (NFC), Bluetooth™, Bluetooth LE™ (BLE), WiFi, or other suitable connection(s) that enables the sending and receiving of information between service-providing terminal 102 and one or more other entities. In other embodiments, service-providing terminal 102 may communicate with one or more other entities through a dedicated communication link(s). Network 106 may take other forms as well.

In some embodiments, service-providing terminal 102 may be configured to communicate, through network 106, with a service-providing system 108. Service-providing system 108 may be any system configured to support service-providing terminal 102. For example, in embodiments where service-providing terminal 102 is an ATM, service-providing system 108 may be a financial service provider system configured to support financial services provided by service-providing terminal 102. As another example, in embodiments where service-providing terminal 102 is a mobile communication device, service-providing system 108 may be a communication service provider system configured to support communication services provided by service-providing terminal 102. Service-providing system 108 may take other forms as well.

While one network 106 and one service-providing system 108 are shown, it will be understood that system 100 may include any number of networks and/or service-providing systems. In some embodiments, for example, service-providing terminal 102 may be a stand-alone device, and no network 106 or service-providing system 108 may be included in system 100. System 100 may take other forms as well.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2A:
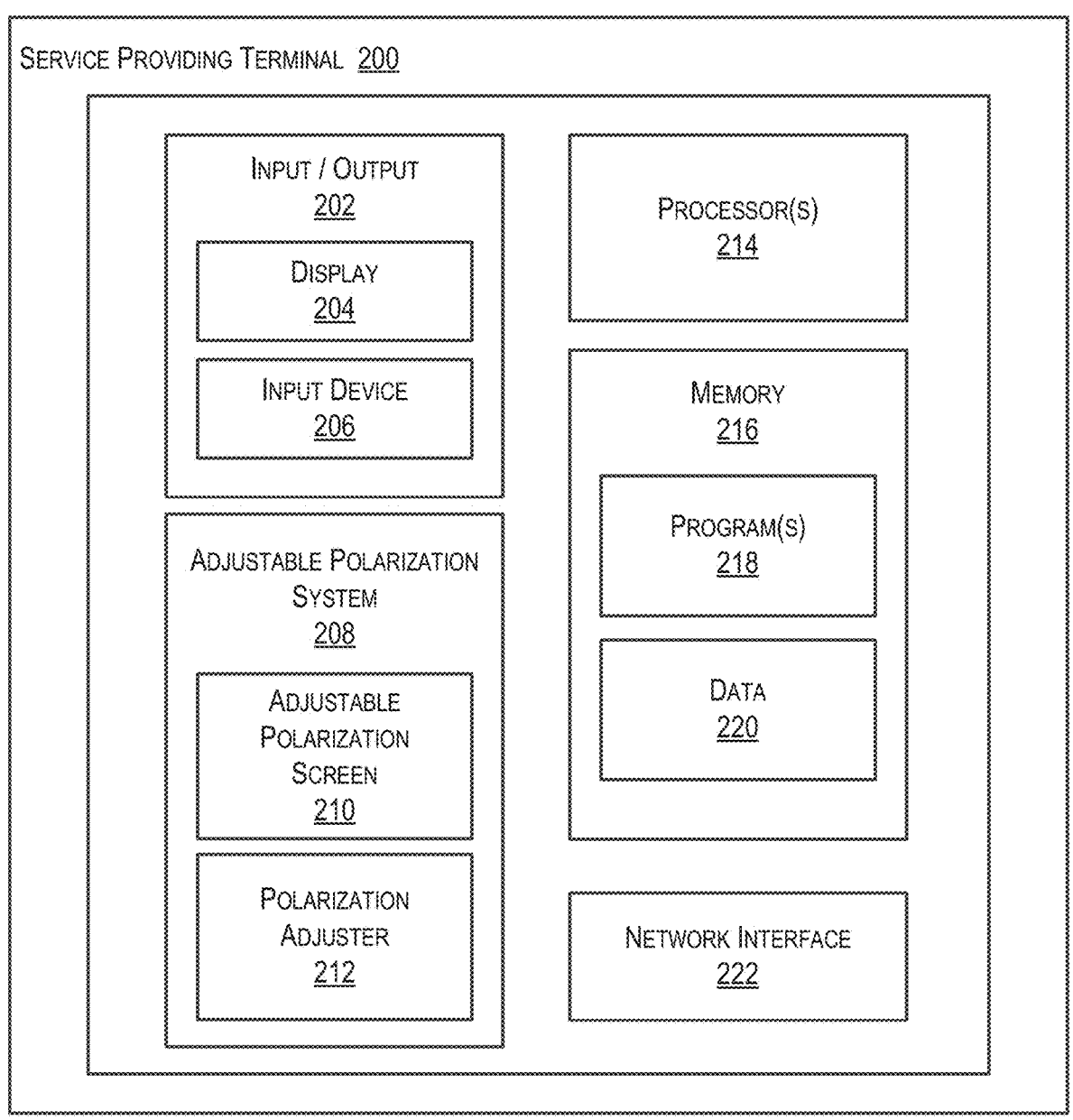
FIGS. 2A-2B illustrate example service-providing terminals, in accordance with disclosed embodiments.

FIG. 2A is a block diagram illustrating an example service-providing terminal 200, in accordance with disclosed embodiments. Service-providing terminal 200 may take any of the forms described above for service-providing terminal 102 in connection with FIG. 1.

As shown, service-providing terminal 200 may include an input/output device 202. Input/output device 202 may be any device configured to receive inputted information and/or provide outputted information. In some embodiments, input/output device 202 may be configured to receive inputted information from and/or provide outputted information to a user of service-providing terminal 200.

In some embodiments, input/output device 202 may include a display 204. Display 204 may be any device configured to provide outputted information. In some embodiments, display 204 may take the form of one or more of a liquid crystal display (LCD), a cathode ray tube (CRT) display, a plasma display, a light-emitting diode (LED) display, or an organic LED (OLED) display. Display 204 may take other forms as well.

In some embodiments, display 204 may be configured to display information by selectively polarizing non-polarized light provided to display 204. For example, display 204 may comprise a number of pixels, each of which includes a layer of liquid crystal between two polarizing filters. The liquid crystal may be configured to change orientation based on a provided voltage, and the changed orientation may cause a change in polarization. In this manner, by controlling a voltage provided to each pixel, display 204 may control the orientation of the liquid crystals in each pixel, thereby selectively polarizing the non-polarized light. Other polarization methods may be used to alter a viewing angle or visibility of display 204. Operation of display 204 is further described below in connection with FIGS. 4A-4B and 5A-5D.

In some embodiments, input/output device 202 may include an input device 206. Input device 206 may be any device configured to receive inputted information. In some embodiments, input device 206 may take the form of a mechanical input, such as a button, knob, or lever. Alternatively or additionally, in some embodiments input device 206 may take the form of an electrical input, such as a capacitive, resistive, or optical input. For example, input device 206 may take the form of an infrared input configured to detect movement of a user's hand(s). In some embodiments, input device 206 may take the form of a touch screen, and display 204 may be and/or may include the touch screen. Input device 206 may take other appropriate forms to enable information input by the user.

Service provider terminal 200 may further include an adjustable polarization system 208, which may include an adjustable polarization screen 210 and a polarization adjuster 212. Adjustable polarization screen 210 may be any screen configured to modify a polarization of illumination provided to the adjustable polarization screen 210. In some embodiments, adjustable polarization screen 210 may be similar to an LCD display. Adjustable polarization screen 210 may take other forms as well. In some embodiments, part or all of adjustable polarization system 208 may be built into display 204.

Adjustable polarization screen 210 may be configured such that a polarization of adjustable polarization screen 210 may be controlled by controlling a voltage provided to adjustable polarization screen 210. In some embodiments, for example, adjustable polarization screen 210 may comprise a number of pixels, each of which includes a layer of liquid crystal between two polarizing filters. The liquid crystal may be configured to change orientation based on a provided voltage, and the changed orientation may cause a change in polarization. In this manner, by controlling a voltage provided to adjustable polarization screen 210, the orientation of the liquid crystals may be adjusted, thereby adjusting polarization of adjustable polarization screen 210. Operation of adjustable polarization screen 210 is further described below in connection with FIGS. 4A-4B and 5A-5D.

Polarization adjuster 212 may be configured to control the polarization of adjustable polarization screen 210. In some embodiments, polarization adjuster 212 may be configured to control a polarization of adjustable polarization screen 210 to any value between and including 0° and 90°. In some embodiments, for example, polarization adjuster 212 may be configured to control a polarization of adjustable polarization screen 210 to a first polarization between and including 0° and 90°. Further, polarization adjuster 212 may be configured to adjust the polarization of adjustable polarization screen 210 from the first polarization to a second polarization between and including 0° and 90°. The second polarization may be different from the first polarization. Further, the second polarization may be non-orthogonal to the first polarization. Other polarizations are possible as well.

In some embodiments, polarization adjuster 212 may include a driver configured to control a voltage provided to adjustable polarization screen 210. The polarization adjuster 212 may be configured to control the adjustable polarization screen 210 to the first polarization by, for example, controlling the voltage provided to the adjustable polarization screen 210 to a first voltage. Further, the polarization adjuster 212 may be configured to adjust the adjustable polarization screen 210 from the first polarization to the second polarization by, for example, controlling the voltage provided to adjustable polarization screen 210 from the first voltage to a second voltage.

In some embodiments, input device 206 may be configured to receive a polarization selection input. For example, a user of service-providing terminal 200 may use input device 206 to select a polarization. In some embodiments, the user may select a polarization by adjusting an appearance of display 204, such as a "brightness" or "contrast." For example, the user may use input device 206 to increase or decrease the "brightness" or "contrast" of display 204. As still another example, the polarization selection input may be pre-defined for a user, and a user may select the polarization by, for instance, providing identification of the user. The polarization selection input may take other forms as well.

In some embodiments, polarization adjuster 212 may adjust the polarization of adjustable polarization screen 210 as the polarization selection input is received. For example, as a user gradually adjusts a "brightness" or "contrast" of display 204 using input device 206, polarization adjuster 212 may gradually adjust the polarization of adjustable polarization screen 210, thereby adjusting a "brightness" or "contrast" of display 204. Alternatively, in some embodiments, polarization adjuster 212 may adjust the polarization of adjustable polarization screen 210 after the polarization selection input is received. For example, as a user may select an increase in "brightness" or "contrast" of display 204 using input device 206, and, upon receiving the polarization selection input, polarization adjuster 212 may adjust the polarization of adjustable polarization screen 210, thereby increasing the "brightness" or "contrast" of display 204. The polarization selection input may take other forms as well.

Processor(s) 214 may include one or more known single or multicore processing devices, such as a microprocessor from the Pentium™ or Xeon™ family manufactured by Intel™, the Turion™ family manufactured by AMD™, or any of various processors manufactured by Sun Microsystems, for example. The disclosed embodiments are not limited to any type of processor(s) otherwise configured to meet the computing demands of different components of service-providing terminal 200.

Memory 216 may include one or more storage devices configured to store instructions used by processor(s) 214 to perform functions related to disclosed embodiments. For example, memory 216 may be configured to store software instructions, such as program(s) 218, that may cause processor(s) 214 to perform one or more operations consistent with disclosed embodiments. The disclosed embodiments are not limited to separate programs or computers configured to perform dedicated tasks. For example, memory 216 may store a single program 218 that performs the functions of service-providing terminal 200, or program(s) 218 may comprise multiple programs. Memory 216 may also store data 220 that is used by program(s) 218.

In certain embodiments, memory 216 may store sets of instructions for carrying out the processes described below in connection with FIG. 3. Other instructions are possible as well. In general, instructions may be executed by processor(s) 214 to perform one or more processes consistent with disclosed embodiments.

The components of service-providing terminal 200 may be implemented as hardware, software, or a combination of both hardware and software, as will be apparent to those skilled in the art. For example, although one or more components of service-providing terminal 200 may be implemented as computer processing instructions, all or a portion of the functionality of service-providing terminal 200 may be implemented instead in dedicated electronics hardware.

It will be understood that service-providing terminal 200 may include more, fewer, or different components than those shown. In some embodiments, service-providing terminal 200 may include additional components associated with a service provided by terminal 200. Service-providing terminal 200 may take other forms as well.

In some embodiments, service-providing terminal 200 may be configured to communicate, through a network, with one or more entities. For example, service-providing terminal 200 may be configured to communicate through a network, such as network 106 described above in connection with FIG. 1, with a service-providing system, such as service-providing system 108. In some embodiments, service-providing terminal 200 may include a network interface 222. Network interface 222 may include, for example, one or more digital and/or analog devices that allow network interface 222 to communicate with and/or detect other components, such as a network controller and/or wireless adaptor for communicating over the Internet. Network interface 222 may take other forms as well.

Figure 2B:
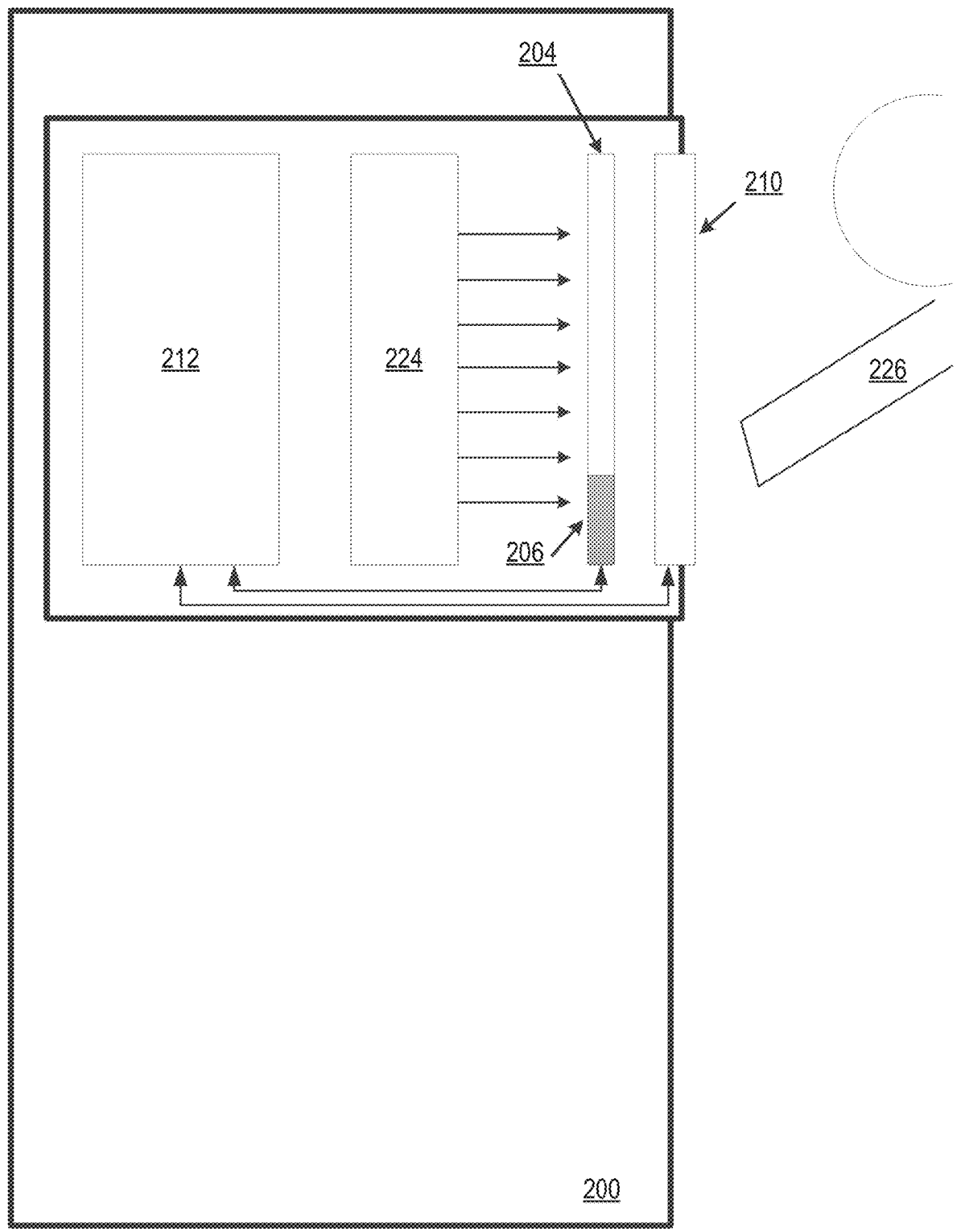

FIG. 2B is an illustration of another service-providing terminal 200, in accordance with disclosed embodiments. While service-providing terminal 200 is shown, for purposes of illustration, to take a certain form, it will be understood that service-providing terminal 200 may take other forms as well.

As shown, service-providing terminal 200 may include display 204 and input device 206, as described above. Further, as shown, service-providing terminal 200 may include adjustable polarization screen 210. Adjustable polarization screen 210 may be adjacent to display 204, as shown. Alternatively or additionally, adjustable polarization screen 210 may be near, next to, in proximity to, or within a range of display 204. Other positioning of adjustable polarization screen 210 and display 204 are possible as well.

In some embodiments, service-providing terminal 200 may further include illumination source 224 configured to provide illumination to display 204. In some embodiments, illumination source 224 may be configured to provide non-polarized light to display 204. For example, illumination source 224 may provide non-polarized light as backlight to display 204. Display 204 may be configured to selectively polarize the non-polarized light and provide the selectively polarized light to adjustable polarization screen 210. In some embodiments, illumination source 224 may be built into display 204.

Service-providing terminal 200 may further include polarization adjuster 212. In some embodiments, polarization adjuster 212 may be communicatively coupled to input device 206 and adjustable polarization screen 210. Polarization adjuster 212 may be configured to control a polarization of adjustable polarization screen 210 to, for example, a first polarization by, for example, controlling a voltage provided to adjustable polarization screen 210 to a first voltage, thereby controlling an orientation of liquid crystals within pixels of adjustable polarization screen 210.

Further, in some embodiments, input device 206 may be configured receive a polarization selection input from, for example, user 226. Based on the polarization selection input, polarization adjuster 212 may be further configured to adjust a polarization of adjustable polarization screen 210 from, for example, the first polarization to a second polarization by, for example, controlling the voltage provided to adjustable polarization screen 210 from the first voltage to a second voltage, thereby adjusting the orientation of the liquid crystals within the pixels of adjustable polarization screen 210. Service-providing terminal 200 may take other forms as well.

Figure 3:
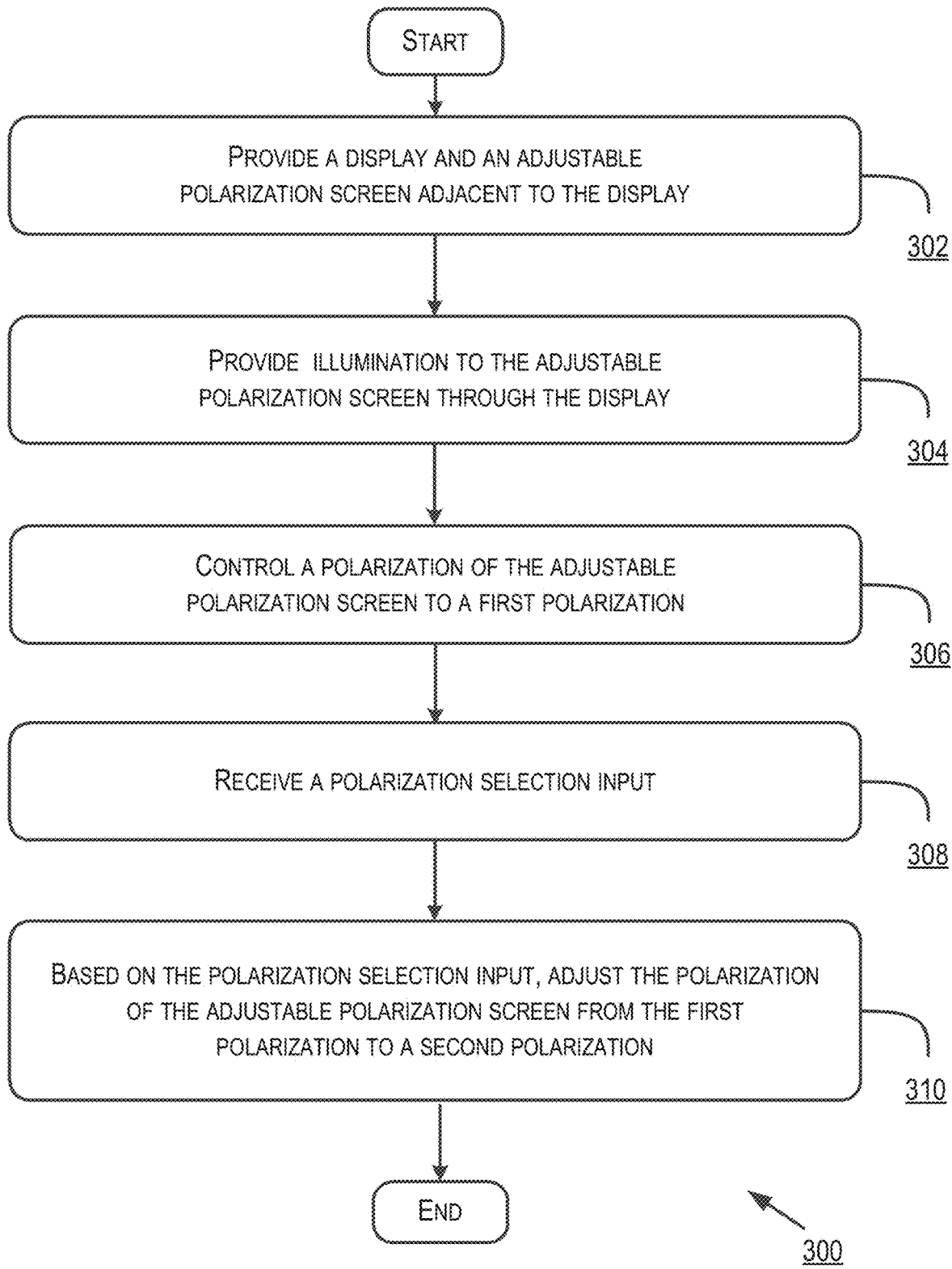
FIG. 3 is an example flow chart illustrating an adjustable polarization method, in accordance with disclosed embodiments.

FIG. 3 is an example flow chart illustrating an adjustable polarization method 300, in accordance with disclosed embodiments. As shown, method 300 may begin at step 302 with providing a display and an adjustable polarization screen adjacent to the display. The display and the adjustable polarization screen may, for example, take any of the forms described above for display 204 and adjustable polarization screen 210, respectively, in connection with FIGS. 2A-2B.

The method 300 may continue at step 304 with providing illumination to the adjustable polarization screen through the display. In some embodiments, providing illumination to the adjustable polarization screen through the display may involve providing non-polarized light to the display. The display may be configured to selectively polarize the non-polarized light and provide the selectively polarized light to the adjustable polarization screen. The illumination may be provided in other manners as well.

The method 300 may continue at step 306 with controlling a polarization of the adjustable polarization screen to a first polarization. In some embodiments, the polarization of the adjustable polarization screen may be controlled by a polarization adjuster, such as polarization adjuster 212 described above in connection with FIGS. 2A-2B. Alternatively or additionally, in some embodiments controlling the polarization of the adjustable polarization screen to the first polarization may involve controlling a voltage provided to the adjustable polarization screen. The polarization may be controlled in other manners as well.

The method 300 may continue at step 308 with receiving a polarization selection input. The polarization selection input may be received from, for example, a user. In some embodiments, the polarization selection input may be received via an input device, such as input device 206 described above in connection with FIGS. 2A-2B. In some embodiments, the display may be or may include a touch screen, and receiving the polarization selection input may involve receiving the polarization selection input through the touch screen. The polarization selection input may be received in other manners as well.

The method 300 may continue at step 310 with, based on the polarization selection input, adjusting the polarization of the adjustable polarization screen from the first polarization to a second polarization. In some embodiments, the polarization of the adjustable polarization screen may be adjusted by a polarization adjuster, such as polarization adjuster 212 described above in connection with FIGS. 2A-2B. Alternatively or additionally, in some embodiments adjusting the polarization of the adjustable polarization screen from the first polarization to the second polarization may involve adjusting a voltage provided to the adjustable polarization screen from a first voltage to a second voltage. In some embodiments, the second polarization may be non-orthogonal to the first polarization.

Method 300 may include more or fewer steps than those shown and, in some embodiments, an order of one or more of steps 302-310 may vary.

Figure 4A:
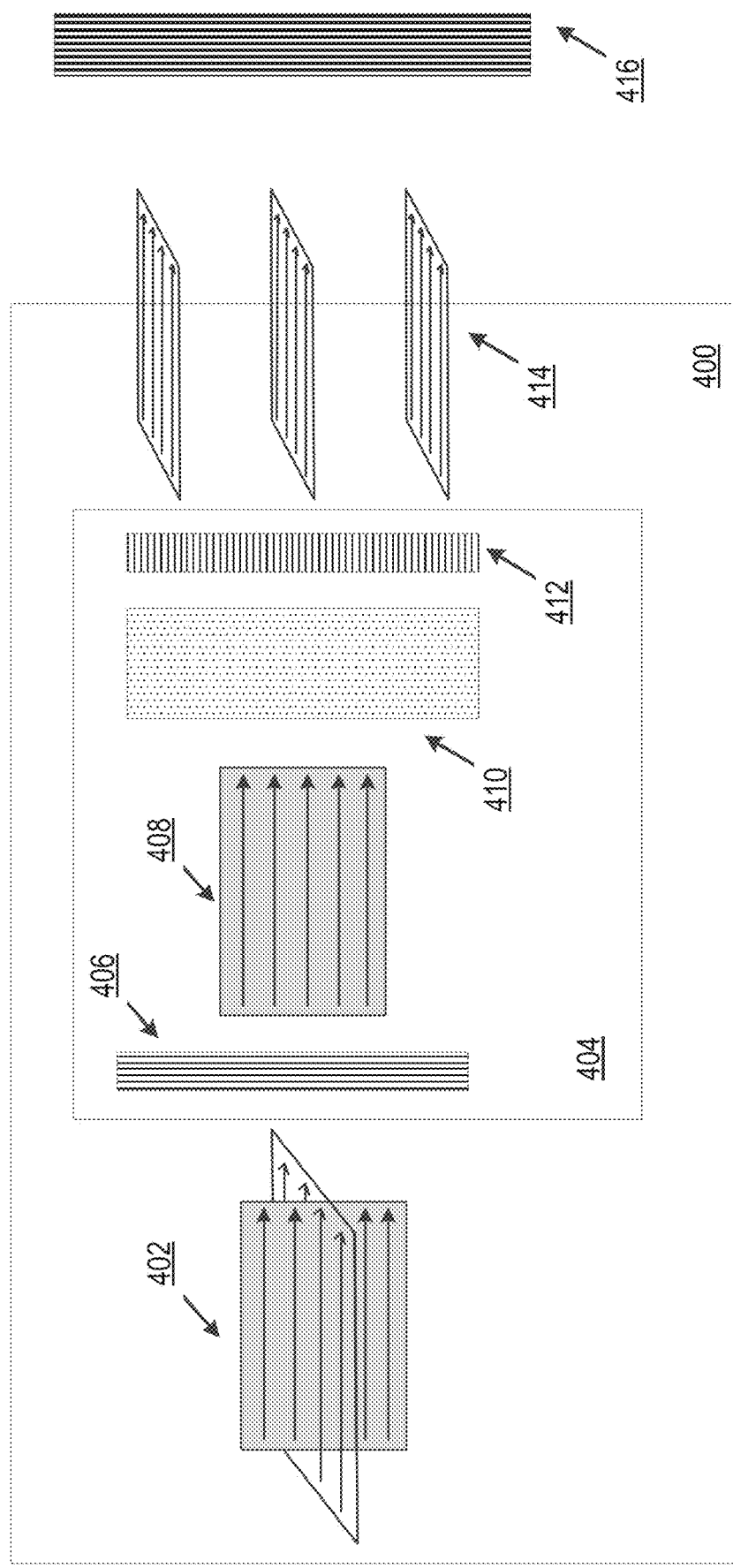
FIGS. 4A-4B illustrate operation of a service-providing terminal that does not include an adjustable polarization system.
Figure 4B:
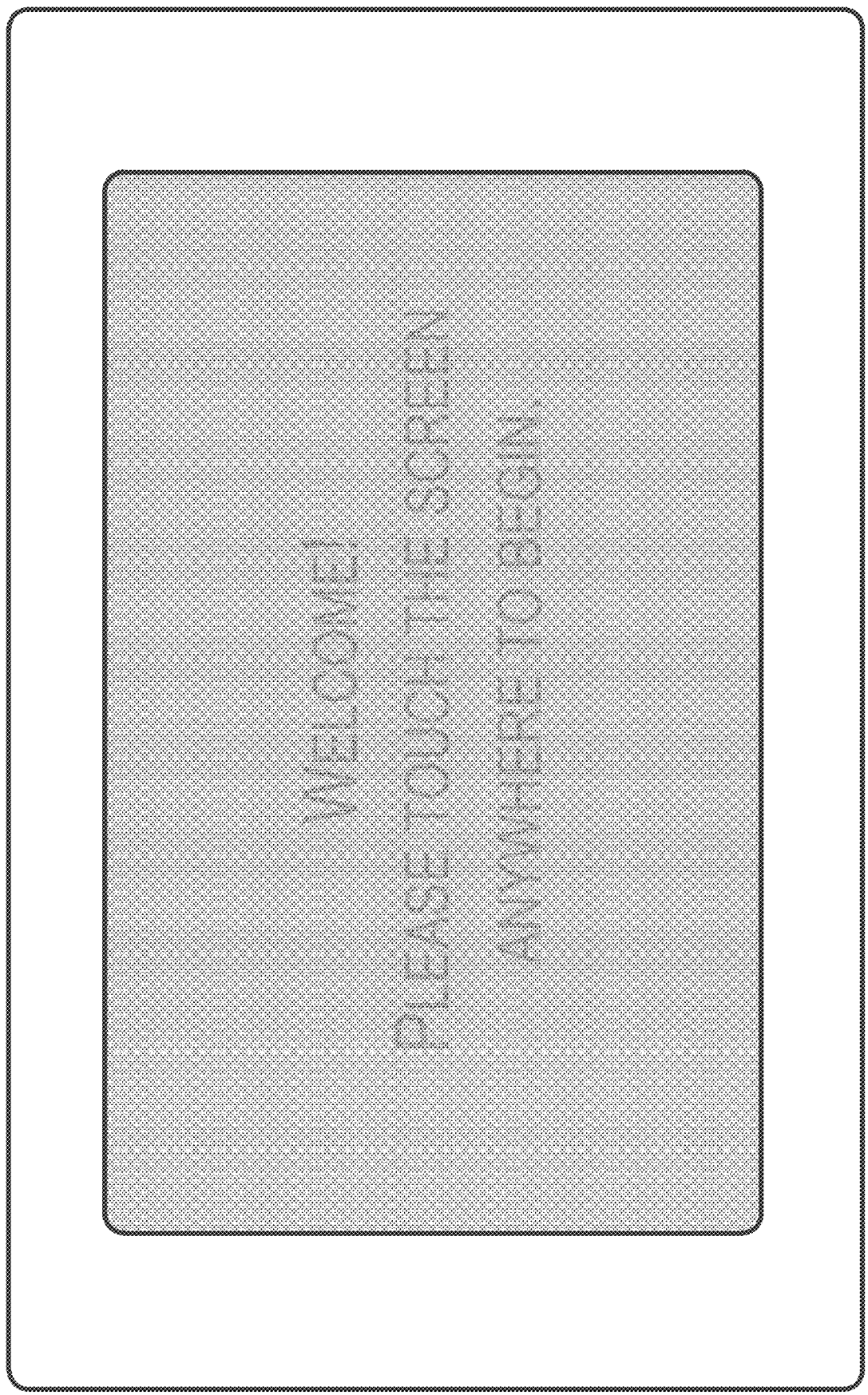

FIGS. 4A-4B illustrate operation of a service-providing terminal 400 that does not include an adjustable polarization system. As shown, service-providing terminal 400 may be configured to provide illumination 402 to a display 404. Illumination 402 may be, for example, non-polarized illumination.

Display 404 may include a first polarization filter 406. When non-polarized illumination 402 passes through the first polarization filter 406, non-polarized illumination 402 may be polarized, resulting in polarized illumination 408. Polarized illumination 408 may be passed through liquid crystals 410. Liquid crystals 410 may be, for example, selectively oriented to provide information on display 404. When polarized illumination 408 is passed through liquid crystals 410 and a second polarization filter 412, polarized illumination 408 may be selectively polarized to produce selectively polarized illumination 414.

When selectively polarized illumination 414 is viewed by a user through a polarized lens 416, the polarizations of the polarized lens 416 and the selectively polarized illumination 414 may destructively interfere, making it difficult for the user to view the information displayed on the display 404, as illustrated in FIG. 4B.

FIGS. 5A-5D illustrate operation of a service-providing terminal 500 that includes an adjustable polarization system, in accordance with disclosed embodiments. Like display 404 described in connection with FIG. 4A, display 504 may include a first polarization filter 506 through which non-polarized illumination 502 may pass, resulting in polarized illumination 508. When polarized illumination 508 is passed through liquid crystals 510 and second polarization filter 512, polarized illumination 508 may be selectively polarized to produce selectively polarized illumination 514.

Display terminal 500 may further include an adjustable polarization system, which may include an adjustable polarization screen 516 and a polarization adjuster 518 configured to control a polarization of the adjustable polarization screen 516. The selectively polarized illumination 514 may pass through the adjustable polarization screen 516 before being viewed by a user through a polarized lens 522. Adjustable polarization screen 516 may have, for example, a first polarization, resulting in first selectively polarized illumination 520.

Figure 5A:
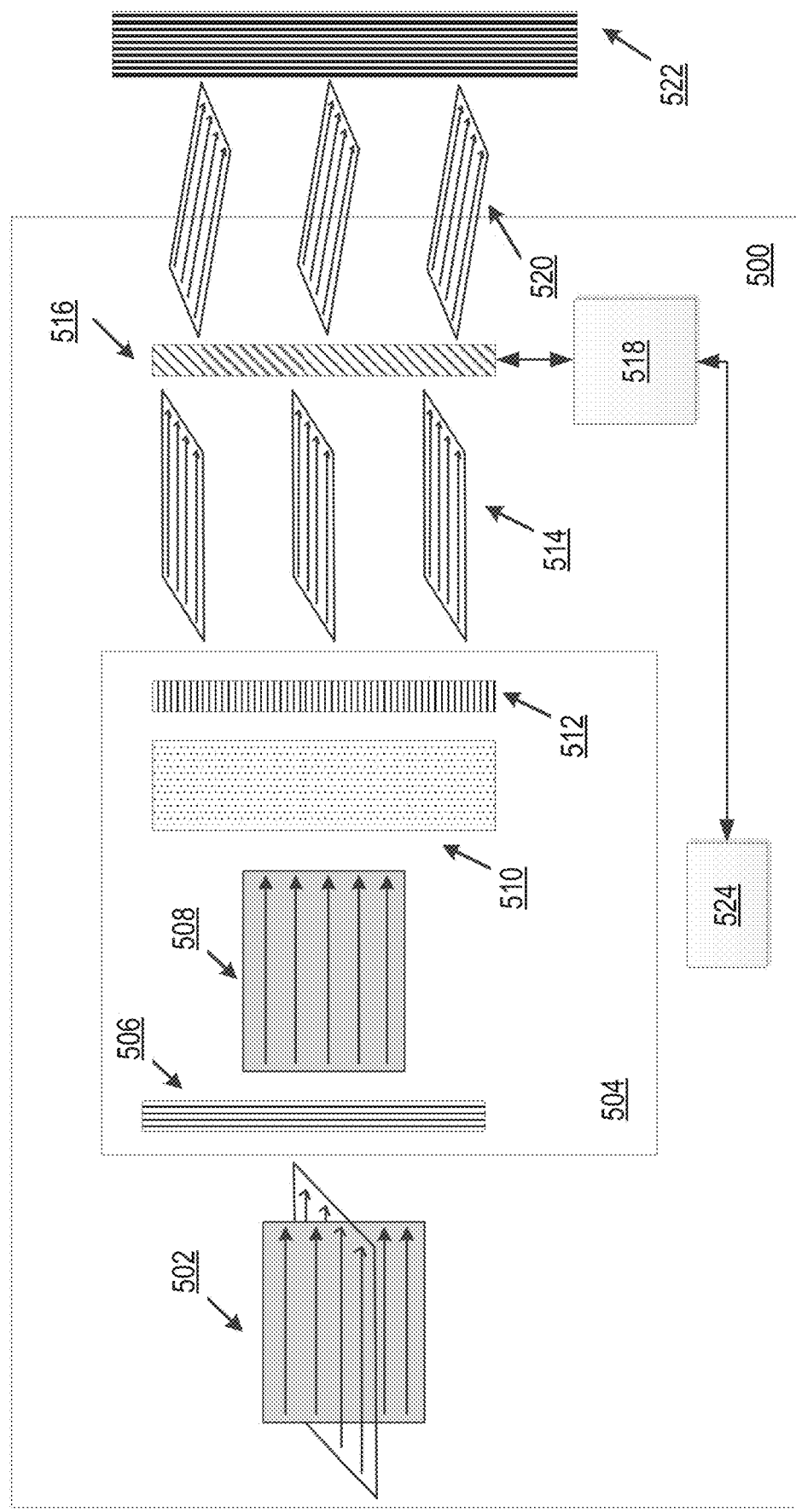
FIGS. 5A-5D illustrate operation of a service-providing terminal that includes an adjustable polarization system, in accordance with disclosed embodiments.
Figure 5B:
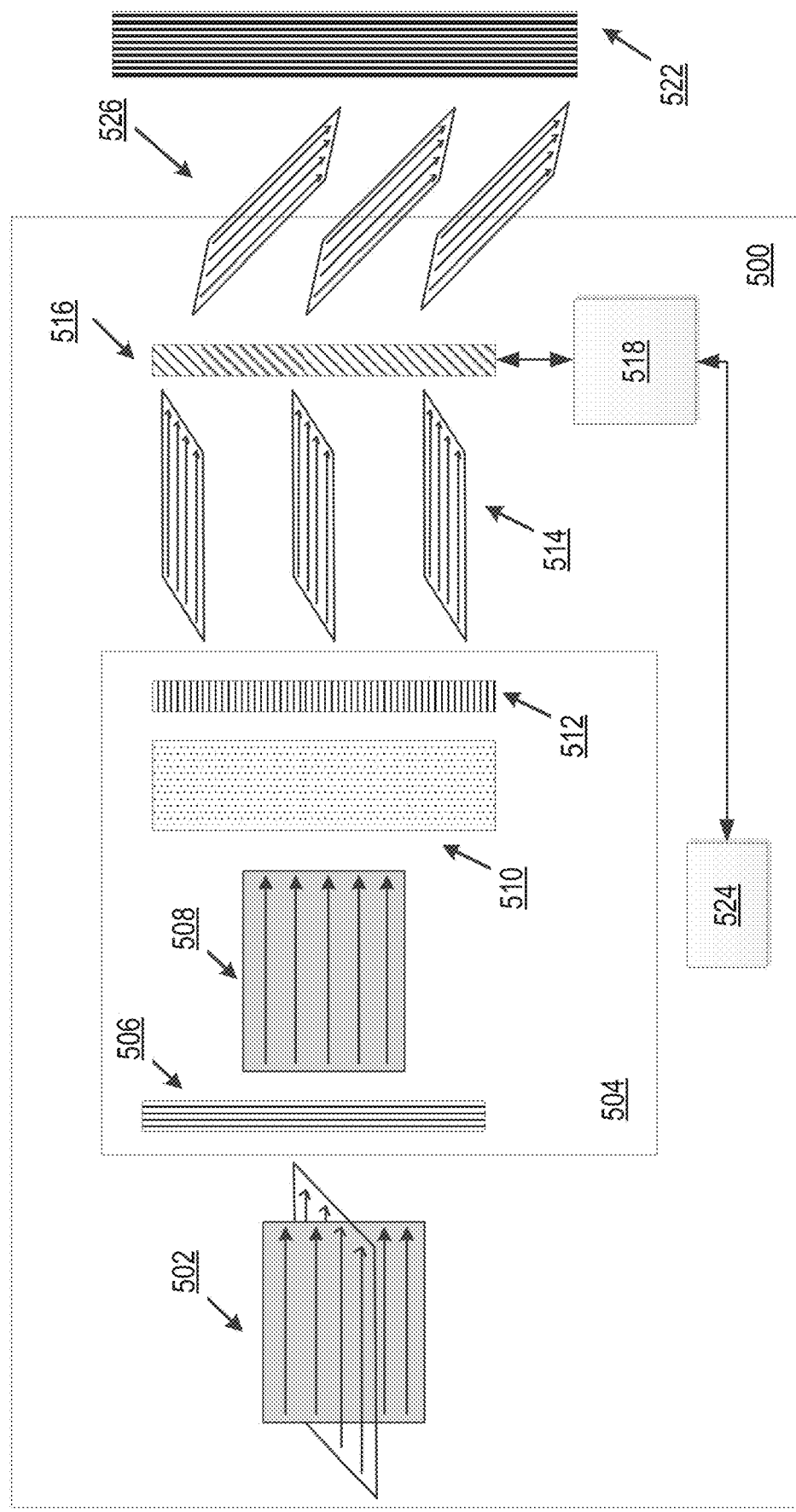
Figure 5C:
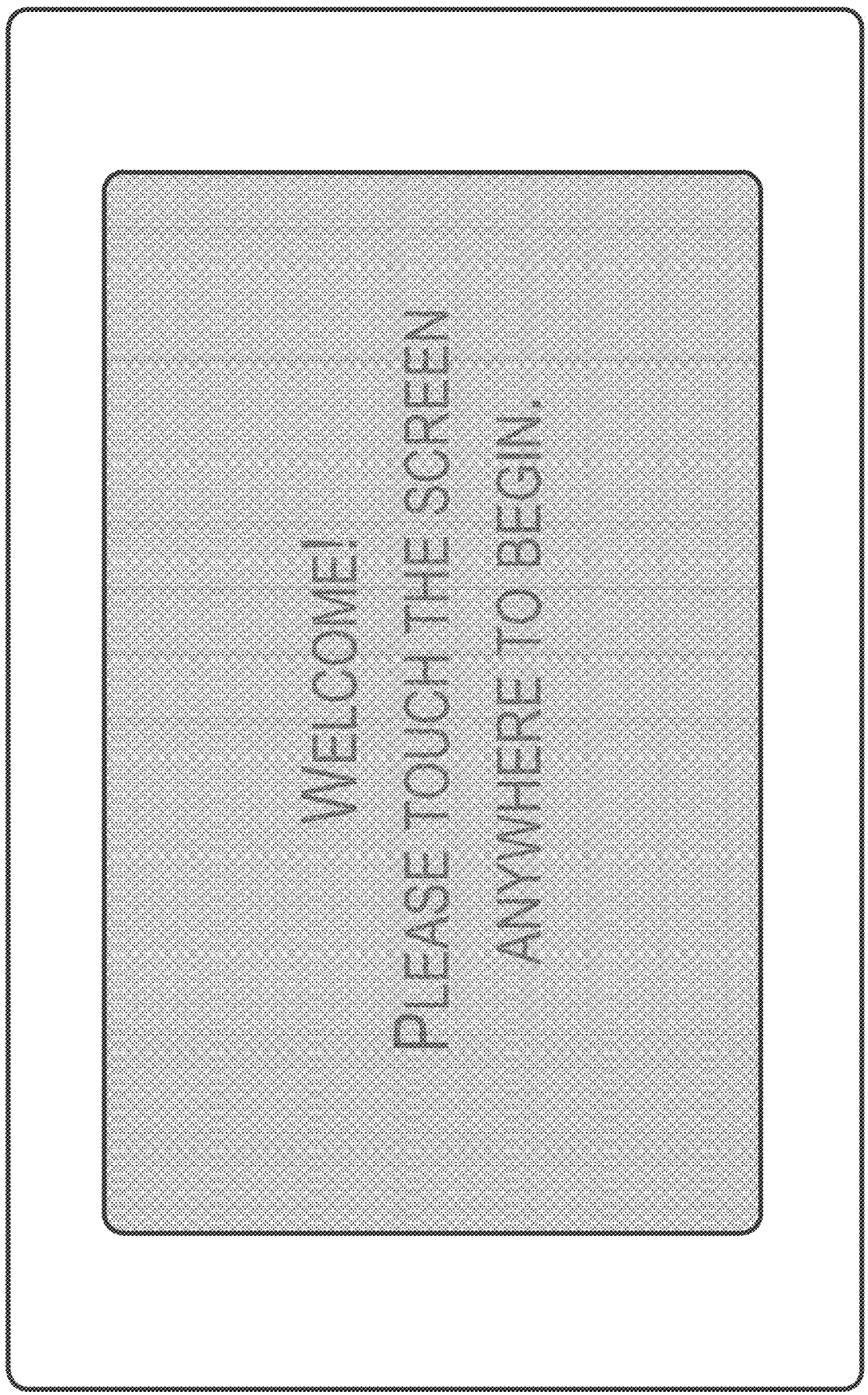

In some cases, when first selectively polarized illumination 520 is viewed by a user through a polarized lens 522, the polarizations of the polarized lens 522 and the first selectively polarized illumination 520 may destructively interfere, making it difficult for the user to view the information displayed on the display 504, as illustrated in FIG. 5C. Use of the adjustable polarization system, however, may enable the user to adjust a polarization of the adjustable polarization screen 516 to improve the user's ability to view the information displayed on the display 504.

As shown in FIG. 5B, for example, a user may adjust a polarization of the adjustable polarization screen 504 from the first polarization to a second polarization. To this end, the user may, for example, provide a polarization selection input to an input device 524 at service-providing terminal 500. For example, the user may select to increase a "brightness" or "contrast" of display 504. Other polarization selection inputs are possible as well.

Based on the polarization selection input, the polarization adjuster 518 may adjust the polarization of the adjustable polarization screen 516 from the first polarization to a second polarization, as shown, by, for example, adjusting a voltage provided to the adjustable polarization screen 516. The second polarization may be non-orthogonal to the first polarization.

Figure 5D:

When selectively polarized illumination 514 passes through the adjustable polarization filter 516, second selectively polarized illumination 526 may result. Second selectively polarized illumination 526 may have a different polarization than first selectively polarized illumination 520. In some cases, when second selectively polarized illumination 526 is viewed by the user through a polarized lens 522, the polarizations of the polarized lens 522 and the second selectively polarized illumination 526 may not destructively interfere or may destructively interfere less, making it easier for the user to view the information displayed on the display 504, as illustrated in FIG. 5D. In this manner, the adjustable polarization system may enable the user to adjust a polarization of the adjustable polarization screen 516 to improve the user's ability to view the information displayed on the display 504.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A service-providing terminal, comprising:
   a display including a first polarization filter and a second polarization filter;
   a polarization adjuster;
   a polarization screen adjacent to the display and comprising a plurality of crystals having orientations determined by an input voltage;
   at least one memory storing instructions; and
   at least one processor configured to execute the instructions to perform operations comprising:
      determining a first selectively polarized illumination of the display based on the first and second polarization filters;
      providing, to the polarization screen via the polarization adjuster, an input voltage having a first value for placing the crystals in a first orientation, the first orientation corresponding to a first polarization;
      determining a polarization selection based on an identity of a user, the polarization selection corresponding to a second value of the input voltage;
      providing the input voltage at the second value to the polarization screen to adjust the orientation of the crystals from the first orientation to a second orientation, the second orientation corresponding to a second polarization;
      determining a second selectively polarized illumination based on the first selectively polarized illumination passing through the polarization screen; and
      updating the second selectively polarized illumination.

2. The service-providing terminal of claim 1, comprising at least one of an automated teller machine, a payment or purchase kiosk, an information kiosk, or a point-of-sale device.

3. The service-providing terminal of claim 1, comprising an input device configured to receive information from the user.

4. The service-providing terminal of claim 1, comprising an output device configured to provide information to the user.

5. The service-providing terminal of claim 1, wherein the display comprises a touch screen.

6. The service-providing terminal of claim 1, wherein the polarization screen is adjustable between 0 degrees and 90 degrees.

7. The service-providing terminal of claim 1, wherein the polarization adjuster comprises a driver configured to provide an adjustable voltage to the polarization screen.

8. The service-providing terminal of claim 1, wherein the display comprises a display providing adjustable brightness and contrast.

9. The service-providing terminal of claim 1, wherein determining the polarization selection comprises receiving a polarization selection input.

10. The service-providing terminal of claim 9, wherein determining the polarization selection comprises determining the polarization selection based on a characteristic of the user.

11. The service-providing terminal of claim 9, wherein the operations further comprise adjusting at least one of brightness or contrast after receiving the polarization selection input.

12. The service-providing terminal of claim 9, wherein the operations further comprise determining the polarization selection input based on a characteristic associated with the identity of the user.

13. The service-providing terminal of claim 1, further comprising an illumination source.

14. The service-providing terminal of claim 13, wherein:
the illumination source is configured to provide non-polarized light to the display; and
the display is configured to selectively polarize the non-polarized light and provide the selectively polarized light to the polarization screen.

15. The service-providing terminal of claim 1, further comprising a communications module for communicating over a network.

16. The service-providing terminal of claim 15, wherein the communications module comprises a communications module for communicating over the network using at least one of near-field communication, Bluetooth, or Wifi.

17. The service-providing terminal of claim 15, wherein the communications module comprises a communications module for communicating over a dedicated communication link.

18. The service-providing terminal of claim 1, wherein the display comprises at least one of a liquid crystal display, a cathode ray tube display, a plasma display, a light-emitting diode display, or an organic LED display.

19. The service-providing terminal of claim 1, further comprising a network interface to a service-providing system.

20. The service-providing terminal of claim 1, wherein the polarization selection is based on an infrared input that detects movement of the user.

* * * * *